(12) United States Patent
Wagner (10) Patent No.: US 12,105,701 B2
(45) Date of Patent: Oct. 1, 2024

(54) BLOCKCHAIN-BASED TRANSACTIONS USING TOKEN TYPES

(71) Applicant: Vivid Seats LLC, Chicago, IL (US)

(72) Inventor: Jonathan M. Wagner, Audubon, PA (US)

(73) Assignee: Vivid Seats LLC, Chicago, IL (US)

( * ) Notice: Subject to any disclaimer, the term of this patent is extended or adjusted under 35 U.S.C. 154(b) by 13 days.

(21) Appl. No.: 17/480,980

(22) Filed: Sep. 21, 2021

(65) Prior Publication Data

US 2023/0092200 A1    Mar. 23, 2023

(51) Int. Cl.
G06F 16/23    (2019.01)
G06F 16/27    (2019.01)
G06K 7/14     (2006.01)

(52) U.S. Cl.
CPC .......... *G06F 16/2379* (2019.01); *G06F 16/27* (2019.01); *G06K 7/1413* (2013.01); *G06K 7/1417* (2013.01)

(58) Field of Classification Search
None
See application file for complete search history.

(56) References Cited

U.S. PATENT DOCUMENTS

| | | | |
|---|---|---|---|
| 2019/0066063 A1* | 2/2019 | Jessamine | G06F 21/629 |
| 2019/0156363 A1* | 5/2019 | Postrel | H04L 67/04 |
| 2020/0351093 A1* | 11/2020 | Madhuram | H04L 9/0819 |
| 2020/0358784 A1* | 11/2020 | Khaund | G06F 9/468 |
| 2020/0380825 A1* | 12/2020 | Purohit | G07F 17/3251 |
| 2020/0394176 A1* | 12/2020 | Wu | G06F 16/9024 |
| 2021/0158335 A1* | 5/2021 | Bollen | G06Q 20/02 |
| 2021/0233200 A1* | 7/2021 | Meltzer | H04L 9/50 |
| 2021/0248214 A1* | 8/2021 | Goldston | G06F 16/686 |
| 2021/0279305 A1* | 9/2021 | Goldston | G06Q 20/389 |
| 2022/0118365 A1* | 4/2022 | Thacker | G06Q 20/065 |

FOREIGN PATENT DOCUMENTS

WO    WO-2021222398 A1 *    11/2021    ......... H04L 63/0807

\* cited by examiner

*Primary Examiner* — Kris E Mackes
*Assistant Examiner* — Cao D Vuong
(74) *Attorney, Agent, or Firm* — Mintz, Levin, Cohn, Ferris, Glovsky and Popeo, P.C.; Frank L. Gerratana, Esq.; F. Jason Far-hadian, Esq.

(57) ABSTRACT

Methods, systems and products for enabling one or more nodes of an electronic ledger platform to carry out operations with respect to one or more records in the electronic ledger platform. The operations include receiving an indication to exchange a first token of a first type with a second token of a second type, the indication being authorized by a first entity, the first token associated with ownership information and comprising activity information, the ownership information indicating that the first token is owned by the first entity and the activity information indicating a first activity, and wherein the ownership of the first token is transferable to other entities over the electronic ledger platform based on the ownership information associated with the first token; generating the second token, in response to the receiving of the indication, the second token associated with the ownership information and comprising admission information.

22 Claims, 6 Drawing Sheets

BLOCKCHAIN-BASED TRANSACTIONS USING TOKEN TYPES

TECHNICAL FIELD

The disclosed subject matter generally relates to transactions (e.g., on a blockchain or other electronic ledger) using token types.

BACKGROUND

Electronic ledgers, such as a blockchain, are used to record ownership of electronic assets and enable entities to carry out transactions using the assets. For example, a token, which is a type of electronic asset, can be transferred among entities by issuing transactions recorded on a blockchain. In many blockchain-based systems, there is a delay between when a transaction is issued and when the transaction is incorporated into a blockchain.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Among other things, we describe implementations of a method of enabling one or more nodes of an electronic ledger platform to carry out operations with respect to one or more records in the electronic ledger platform. The operations include receiving an indication to exchange a first token of a first type with a second token of a second type, the indication being authorized by a first entity, the first token associated with ownership information and comprising activity information, the ownership information indicating that the first token is owned by the first entity and the activity information indicating a first activity, and wherein the ownership of the first token is transferable to other entities over the electronic ledger platform based on the ownership information associated with the first token; generating the second token, in response to the receiving of the indication, the second token associated with the ownership information and comprising admission information, the ownership information indicating that the second token is owned by the first entity and the admission information indicating admission to the first activity, and committing the generation of the second token to one or more records on at least one of a legacy system or an electronic ledger in the electronic ledger platform in accordance with a first protocol.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

Certain types of blockchain-based transactions are carried out quickly and securely using a pair of token types, such that one type of token (which is transferable over the blockchain) is exchanged with another type of token (which is non-transferable over the blockchain). The token exchange may be carried out prior to a time-sensitive event that requires a blockchain transaction to be carried out quickly.

A first token type (sometimes referred to as a "demand token") may be used to manage the transfer of ownership rights to an asset (e.g., an event ticket) on a blockchain. The demand token is transferable over the blockchain and is used to accommodate, monitor, record and possibly control a change of ownership between multiple parties. Processing and validating a transaction using the demand token over the blockchain platform can take a certain amount of time. This is because the protocols associated with the validation requirements are deliberately complex to ensure a secure and authentic transfer before the transaction is committed to the blockchain.

For example, several seconds or minutes may elapse between the time a transaction is issued to a blockchain platform and when the transaction appears in a block as recognized by a threshold number (e.g., majority) of nodes verifying the transaction. For some real-world applications, the delay associated with the verifying and committing a blockchain transaction is impractical. More particularly, in a scenario in which a demand token is to be used to gain admission to an event, the owner of the demand token may not want to wait several minutes, until the demand token is processed, validated and committed to the blockchain. In other words, a blockchain platform can be slow to process thousands of demand token transactions at the time of admission.

To avoid an undesirable delay in time-sensitive blockchain transactions, a second token type (sometimes referred to as an "admission token") may be used to manage the admission of the owner of the demand token in an efficient manner. In use, the demand token is exchanged for the admission token prior to admission (e.g., while an attendee is in transit to the event or waiting in line for the event). An admission token may be processed faster than the demand token because the processing of the admission token does not require verifying and committing the transaction over the blockchain as provided in further detail herein and below.

The right of admission to a venue, such as a live concert, a theme park, or a movie theatre, has traditionally been reserved by way of an individual purchasing a physical ticket and presenting it at the time of entry to the event. With the advent of electronic ticketing technology, it has become possible to purchase an admission ticket (e.g., an e-ticket) from, for example, an online merchant. Thus, consumers can now present a digital version of a ticket instead of the traditional physical version to gain admission.

Tickets, whether electronic or otherwise, represent the attendance rights to an event and can be bought and sold through multiple commercial streams. Typically, a primary ticketing agency is chosen by an event producer or a content rights holder to manage the initial ticket sales. Thereafter, attendance rights held in the form of physical or digital tickets can generally be freely gifted, transferred, or sold by private or professional resellers at a secondary marketplace, either in person or online.

It is well-known that ticket brokers and resellers, especially those in the live events industry, often buy tickets at an initial sale price with the hope and expectation of making a profit by selling the tickets at a premium later. In certain circumstances, exertion of some control in the resale market has been desirable by the primary ticketing agency in order to avoid fraudulent transfers or to prevent activities leading to the creation of a gray or black resale market.

The conventional ticketing systems typically provide zero or very little control over the downstream ticket exchanges, or the price and mechanism for admission. This is because, after a ticket is exchanged, an earlier-in-time seller cannot meaningfully determine or control the activities of a later-in-time seller in the resale marketplace. In particular, the current ticketing systems are generally incapable of accurately monitoring the rightful ownership or the sale price of a ticket in downstream commerce.

Of particular concern is also the notion that electronic ticketing systems and digital tickets can be susceptible to manipulation by unscrupulous actors or resellers, where fraudulently issued or sold tickets can result in unlawful or duplicate admission to an event. As such, maintaining the integrity of an electronic ticketing system and the proper authentication of electronic tickets is of utmost importance.

Further, currently available ticketing and verification technologies are generally not adequately secure. In particular, currently available blockchain-based admission and verification technologies are slow and inefficient when verifying, admitting, and recording the use of a ticket in that significant delays may be experienced during the admission or verification process. Certain venues have thousands of attendees. Using the conventional technologies, admission to a large venue can be hindered by a computational bottleneck effect due to, for example, a lengthy e-ticket verification process.

The above shortcomings can adversely affect ticket sales, profit margins, and consumer satisfaction. It is desirable to improve the speed of admission without compromising the ticket verification process or the safety and integrity of electronic ticketing systems.

To the extent that the right of admission to an event and the ownership rights to a ticket for attending the same event can be bifurcated, in accordance with one or more embodiments, digital tokens are implemented and utilized such that a first token (i.e., an admission token) represents the right of admission to an event and a second token (i.e., a demand token) represents the corresponding ownership rights. The demand token, representing the ownership rights, may be transferred or exchanged in the free marketplace. The admission token, in contrast, once assigned cannot be offered for resale and needs to be reverted back to a demand token for the purpose of resale.

In certain implementations, an issuing system 102 may be configured to issue one or more demand tokens for an event. A demand token may be registered as a written record on an electronic ledger (e.g., a distributed blockchain of connected records). The electronic ledger may be a distributed electronic ledger, a public blockchain or a private blockchain, depending on implementation. Once the demand token is registered on the electronic ledger, an immutable record remains on the electronic ledger by which the demand token may be uniquely identified. The demand token may be verified and executed by an admission system 104 to issue an admission token. The admission token may be a uniquely identifiable token that is coupled (e.g., electronically linked), or otherwise associated with, the executed demand token.

The association between the demand token and the admission token may be recorded and verified by way of the instantiation and registration of the related records on the electronic ledger. The registered records may include ownership details related to the persons or entities who purchased or exchanged the demand token or those who requested the execution of the demand token to obtain an admission token. In certain embodiments, the electronic ledger provides an immutable digital environment which is configured to store and track the related data and metadata associated with the various transactions involving the purchase, sale and exchange of the electronic tokens.

Advantageously, the technology for verifying the authenticity of the electronic tokens may be an integral function of the electronic ledger platform, which uses multiple independent verification checkpoints to verify the authenticity of each transaction associated with an electronic token (i.e., based on a series of verifiable mathematical calculation, rules and algorithms). For example, a demand token representing the ownership rights to a ticket for attending an event may be purchased and sold or otherwise exchanged via a series of verifiable transactions recorded on the electronic ledger. Because the verification of a transaction may necessarily involve the re-verification of some or all of the prior transactions recorded on the electronic ledger, the chances for fraud are significantly reduced.

Accordingly, in some aspects or embodiments, the use of the electronic ledger provides for managing and verifying transactions involving ownership rights of a ticket to be performed in an inherently safe and secure transaction environment with means to identify and track the authenticity of the transactions from an initial point of sale all the way down to the later points of sale. The tracking or monitoring of the related transactions and sales in the secondary market may be configured such that a chain of title to the demand token is preserved in the immutable records registered in the electronic ledger.

As suggested earlier, depending on the financial exchange utilized and other details involving the processing and verification of a transaction on the electronic ledger, significant resources may be required to verify each transaction. For example, processing a transaction involving Bitcoin or other type of cryptocurrency as a form of payment may take a relatively long period of time (e.g., several minutes depending on the verification protocol enforced). Such wait time is undesirable during admission to live events and is generally unacceptable to the extent that it would create long queues for admission and would likely result in consumer dissatisfaction.

In certain embodiments, to overcome the above-noted shortcoming, instead of using a single token system to provide exchange and admission capabilities for an event, a demand token and a corresponding but separate admission token are utilized. The admission token may be an executed instance of the demand token. The bifurcation between the right to "own" and the right to "attend" based on the instantiation of two separate tokens (i.e., two different types of tokens) for the same event provides for the possibility for selling or exchanging the right of admission over a secure electronic ledger. The ultimate purchaser of a demand token may then request to receive a respective admission token, when the purchaser decides to attend the event.

When an admission token is issued to the owner of the demand token, the holder of the admission token can be immediately admitted to attend the corresponding event. The processing of an admission token is distinguishable from the processing of a demand token. The latter would typically involve the exchange of ownership and payment verification, a process subject to authentication and verification dynamics and requirements that are complex and time consuming. Execution of the demand token results in generation of an admission token that is not subject to as strict authentication and verification requirements or protocols (e.g., recording an admission and preventing duplicate entry or a race condition on ticket transfer) and can be therefore processed in a timely manner.

Once the demand token is executed in exchange for the issuance of a corresponding admission token, the executed demand token is effectively revoked and can no longer be used. The admission token may be a mathematical derivative of the demand token and would desirably be represented by a unique identifier so that the admission token represents a single unique ticket for the purpose of admission to an event. As such, in accordance with one or more embodiments, the admission token may be presented by the holder at the time of entry to an event. As provided in further detail below, upon verification and authentication, the holder would be provided with immediate admission to the event.

Because the authentication and verification of the admission token, in certain embodiments, may not require the same complexity or level of scrutiny as that required or associated with a demand token, an admission token may be verified a lot faster and without significant delay. The use of the admission token for attending an event is thus advantageous over an alternative in which the same token (i.e., the demand token) is used for enabling the exchange and the admission activities.

In other words, the admission token may be configured so that the admission token can be verified easily and in a timely fashion and to allow the holder of the corresponding ticket immediate admission to the event. Transactions involving change of ownership are not as time sensitive as transactions involving the admission of a ticket holder to an event. For that reason, a wait time may be tolerable and acceptable if the transaction can be achieved securely and with a high level of confidence using the requirements of an electronic ledger, when processing transactions involving the exchange of a demand token.

Thus, a higher level of scrutiny may be applied to processing demand tokens. For example, strict requirements or protocols may be enforced for verifying ownership rights and processing payments in association with the exchange of demand tokens. The owner of the demand token may in advance of the time of attendance submit a request for the demand token to be executed in exchange for the issuance of an admission token, which can be processed and verified in substantially less amount of time. Technical details on how the above functionality may be implemented are provided in further detail below.

In accordance with one or more implementations, an electronic ledger environment configured for ticketing and admission rights management is provided in which one or more entities (e.g., an issuing system 102 and an admission system 104) control and orchestrate functions and operations associated with the issuance, execution, transfer, assignment, and revocation of digital tokens. The digital tokens (e.g., a demand token and an admission token) maybe implemented or instantiated to represent certain rights to buy or sell event tickets or admission to an event or venue.

Definitions

Definitions for certain terminology as applicable to one or more embodiments disclosed herein are provided below for the purpose of clarity and context but without the intention to unduly limit the scope of the claimed subject matter to any specific examples or details.

As used herein, a token refers to a digital asset representing ownership or other interest rights. In this context and as provided in further detail below, a token may be transferred between parties who may have an interest in buying, selling or transferring admission rights to an event or venue. A content rights holder refers to one or more producers of an event, who initially own and control the rights to attend the event or venue. In this context, admission or admitting refers to the act of allowing one or more people to attend an event by validating their right to attend.

A demand token refers to a token representing the right to demand an asset from another party. In this context, a demand token may represent ownership rights and more particularly the right to demand a ticket, ticket token, or admission token from one or more parties or entities participating in a token exchange. An admission token, in contrast, may be a token that represents the right to attend an event. An admission token essentially can be a printed ticket, or the digital equivalent to a printed ticket. A ticket, as used herein, may refer to either a demand token or an admission token.

An admission token is a bearer instrument (e.g., a physical token such as a paper ticket, or a digital token such as a scanable or printable indicia or ticket) that allows admission to an event, a venue, and in some circumstances may also represent the right to attend or own a tangible or non-tangible asset, whether fungible or non-fungible. A demand token is a digital token representing the ownership of a ticket. A zone ticket refers to the obligation for a seller to provide a ticket to a buyer in a certain section or with certain qualities. Seat license rights refer to the rights to purchase tickets for an event.

Depending on implementation, an admission token may be structured as one or more of the following:
  A demand token in a non-transferable state recorded in a first electronic ledger,
  A non-transferable token recorded in the first electronic ledger in which a corresponding demand token is recorded,
  A non-transferable token recorded in a second electronic ledger other than the first electronic ledger in which the corresponding demand token is recorded, or
  A token or identifier in a legacy computing system implemented to correspond to a respective demand token in the first electronic ledger.

In certain embodiments, an electronic ledger is used to record a list of changes to a set of data that represent purchases of items, transfers of ownership, or any other changes in data records. A digital signature of a data record may be a cryptographic technique that allows a verifying entity to strongly trust that the data record was generated or certified by a specific party. A digital signature may be applied to individual data records or collections of records, in certain implementations.

A distributed electronic ledger as used herein refers to an electronic ledger where different parts of the ledger are stored in different systems, often but not necessarily owned by different parties. A distributed ledger may be partitioned by record, by field, or a combination of the two. A blockchain may be a transactional or distributed ledger trusted by digital signatures that certify the content and/or sequence within the ledger. Individual records may also be certified through digital signatures by other parties. Although "blockchain" and "electronic ledger" are sometimes used interchangeably in this description, a blockchain is just one type of electronic ledger, and the techniques described here can be used just as effectively with other types of electronic ledgers.

A smart contract refers to a set of business logic that governs valid entries in an electronic ledger. In some embodiments, a smart contract may be registered or distributed within a blockchain so that participants can validate or execute steps defined in the contract. Consensus refers to a mechanism or protocol that allows multiple parties to agree on the content of a block in a blockchain or distributed ledger. Proof of Work and Proof of Stake are examples of consensus mechanisms that may be utilized in accordance with one or more embodiments to verify transactions on a blockchain.

A smart contract may be utilized to, for example, allow the performance of credible (i.e., trackable and irreversible) transactions without involving a centralized managing party. The transactions may be processed by serverless microservice engines (e.g., Lambdas or other decentralized infrastructure) on a distributed ledger platform. To enable financial transactions, in certain embodiments, tokens (e.g., personal trading units) are utilized to monetize digital transactions without the need for a centralized institution (e.g., a bank).

A consistent audit trail of transactions, exchanges and activities may be maintained by way of using an electronic ledger, which may be implemented as a publicly accessible message queue with an immutable database. Examples of computing platforms that may be used to implement a distributed ledger may include a blockchain, a hashgraph, or other computing data structures implemented based on a growing list of N-associated records or data blocks in a blockchain.

A data block may be logically linked to another block (e.g., a previous block) in a distributed ledger based on a cryptographic hash of the content of the other block. A data block may also include a timestamp or transaction data. Further, a data block in a distributed ledger may be implemented to be immutable (i.e., resistant to modification of the data stored within the block). The immutable nature of the data block and the acceptance of a set of rules and policies by the users (or the implementers) of the distributed ledger platform provides for high levels of confidence in the data stored and processed by the distributed ledger because a singular central entity is not solely in control.

One or more distributed ledgers may be implemented to include or interface with smart contracts in the form of computing engines. A smart contract may be a digital promise entailing rights and duties voluntarily agreed by the parties to a contract configured to digitally facilitate, verify, or enforce the negotiation or performance of an agreement between the parties. In one embodiment, the smart contract may be implemented based on a combination of protocols with user interfaces to formalize and secure relationships over computer networks, using cryptographic and other security mechanisms.

EXAMPLE IMPLEMENTATIONS

Figure 1A:
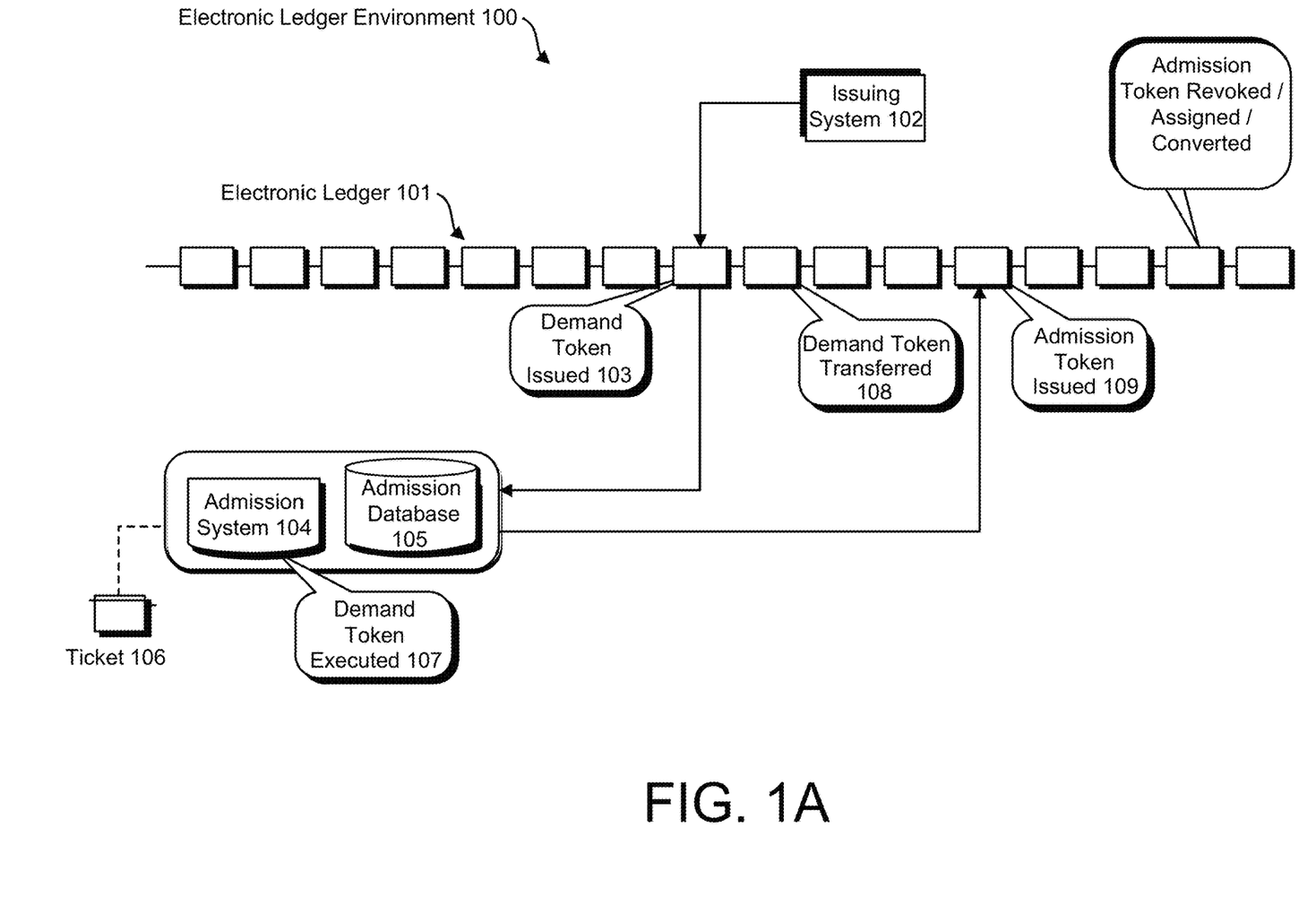
FIG. 1A illustrates an example electronic ledger environment, in accordance with one or more embodiments, wherein an electronic ledger in communication with an issuing system and an admission system may be utilized to manage ticket sales.

Referring to FIG. 1A, an electronic ledger environment 100 may be implemented as an immutable mechanism for ticket issuance and transaction flow management in which parties involved in issuing and executing electronic tickets may write and read data and instructions associated with one or more processes using an electronic ledger 101. The electronic ledger 101 may provide the infrastructure in which the parties that manage the ticketing process may communicate by writing to block addresses designated to the parties engaged in the process.

As shown, the example electronic ledger 101 includes a plurality of linked data blocks. The electronic ledger 101 may be communicatively connected or coupled to issuing system 102 and admission system 104 configured to respectively issue and execute one or more digital tokens, such as a demand token. A user may interact with the issuing system 102, by way of a user interface mechanism for example, to request a demand token to be issued.

The process model for the electronic ledger 101 may define parameters and constraints associated with the manner in which token data is to be utilized or manipulated. For example, in certain embodiments, the rules for managing the demand and admission tokens may provide for the following:
  A demand token to be recorded on the electronic ledger 101.
  The demand token to be freely transferred on the electronic ledger 101 subject to any smart contracts.

The demand token to be executed to request an admission token.

An admission token to not be transferable on the electronic ledger 101.

An admission token to be exchangeable for a demand token.

Admission tokens to be stored or redeemed either on the electronic ledger 101 or in another system (e.g., an event provider's point of sale system).

Figure 1B:
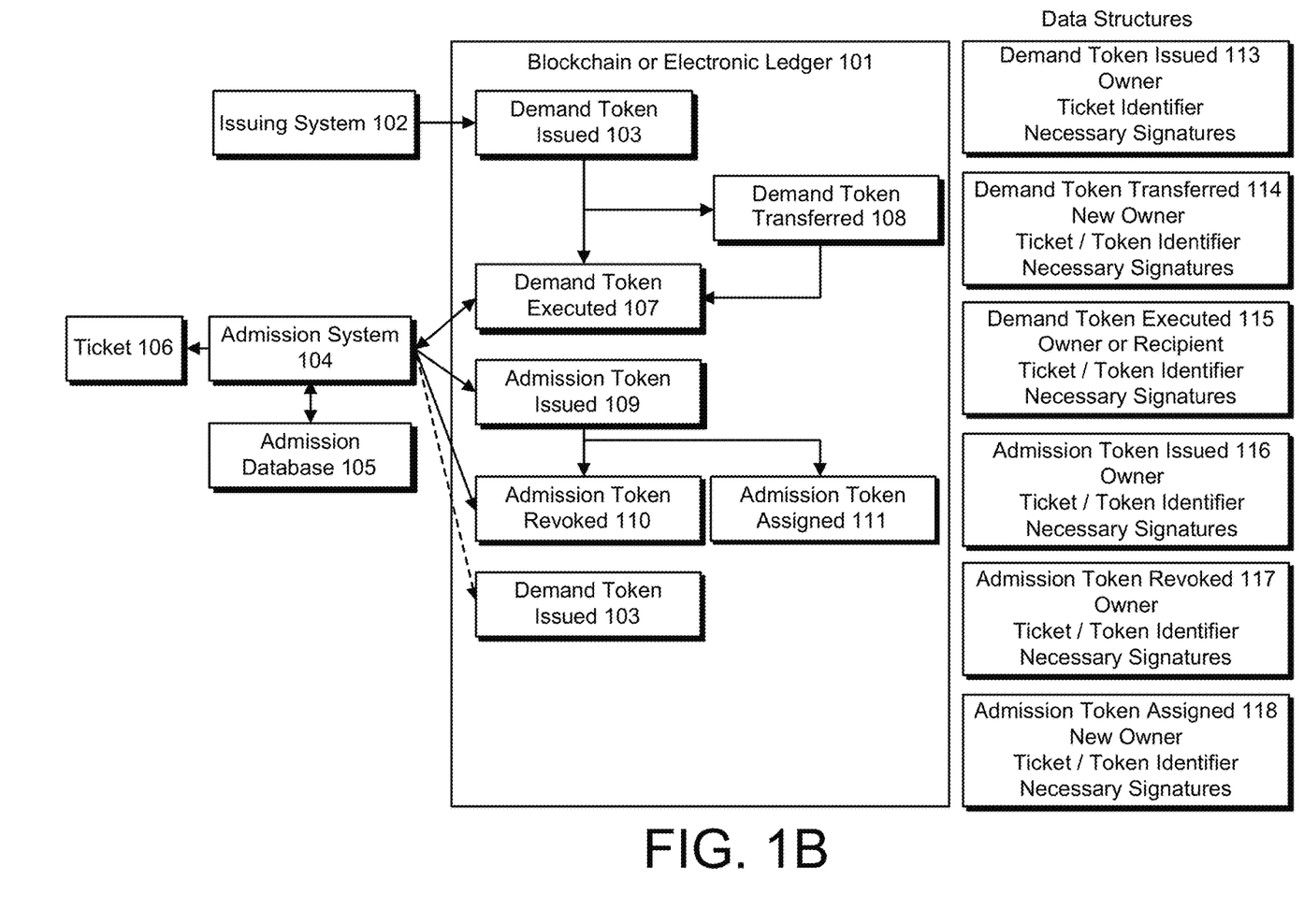
FIG. 1B illustrates an example blockchain or distributed ledger, in accordance with one or more embodiments, where the electronic demand and admission tokens may be issued, executed, assigned and revoked.
Figure 2A:
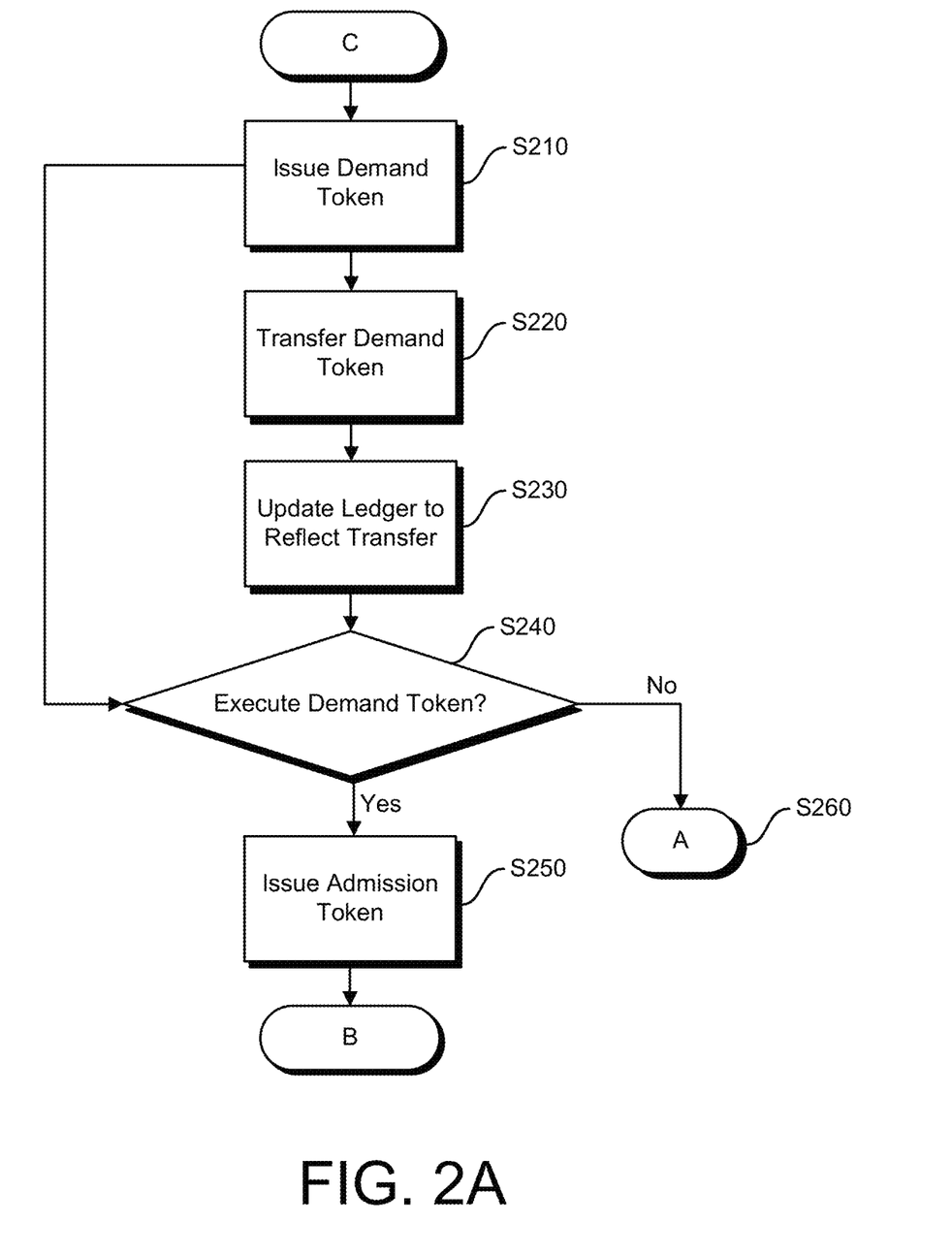
FIGS. 2A and 2B are example flow diagrams for managing demand and admission tokens using a distributed electronic ledger environment or platform, in accordance with one or more embodiments.

Referring to FIGS. 1A, 1B and 2A, the process for managing demand tokens and admission tokens may be implemented by enabling one or more nodes of an electronic ledger platform to carry out operations with respect to one or more records in the electronic ledger platform. These operations, in one example, include the electronic ledger platform receiving an indication to exchange a first token of a first type (e.g., a demand token) with a second token of a second type (e.g., an admission token). The indication received as authorized by a first entity (e.g., a seller or owner of an event ticket) allows for the exchange of the first token with the second token.

The first token, in some aspects, is associated with ownership information that indicate the first token is owned by the first entity. The first token may also include activity information about a first activity (e.g., a concert to be held at a certain date and time). The ownership of the first token is transferable to other entities (e.g., buyers, resellers, or the general public) over the electronic ledger platform according to the ownership information associated with the first token as provided in further detail below.

The electronic ledger platform, in response to the receiving of the indication to exchange the tokens, generates the second token, which is associated with the ownership information and may also include admission information. The ownership information indicate that the second token is owned by the first entity. The admission information indicate that the second entity is to be provided admission to the first activity. The generation of the admission token may be committed to one or more database records of a legacy system, or records in an electronic ledger platform, in accordance with a first protocol.

Referring back to FIG. 2A, in one example embodiment, an issuing system 102 issues a demand token (S210). The issuing of the demand token may be accomplished by writing the demand token on a block of electronic ledger 101. The issuing system 102 may be, without limitation, a sales system or an admission system 104 depending on implementation. The block on the electronic ledger that stores a record to reflect the issuance of the demand token may include data identifying a first-in-time or earlier-in-time owner, a ticket identifier, and/or the electronic signatures used for verifying the authenticity of the record.

The ownership of the demand token may be transferred from a first party to a second party by committing a transaction associated with the transfer of the ownership to one or more records on the electronic ledger. Parties may (but need not) transfer the ownership of the demand token by writing a demand token transfer record to a block on the electronic ledger. The record reflecting the transfer may include one or more of data identifying a second-in-time or later-in-time owner, a reference to the ticket or token identifier, and the respective signatures for authentication of the record. At this state of the transaction, the ownership of the demand token is deemed to have been transferred from a first owner to a second owner (S220). Subsequent demand token transfers may be performed to transfer ownership to subsequent owners and the electronic ledger blocks may be updated to reflect the transfer (S230).

In some embodiments, the ownership of the demand token becomes non-transferable, in response to generating the admission token. While the ownership of the admission token may be assignable, the admission token may be non-transferable over the electronic ledger or not recorded on the electronic ledger at all. The demand token is generated by the issuing system 102, where the admission token is generated by executing the demand token by the admission system 104. The admission system 104 is notified of a request for execution of the demand token based on reading an execution request written to a record of the electronic ledger. Advantageously, the ownership information associated with the demand token is traceable based on the ownership information written to a record of the electronic ledger (e.g., when ownership of the demand token is transferred from a seller to a buyer).

Referring again to FIG. 2A, in certain embodiments, the owner of a demand token may have the option to execute the demand token (S240) in order to receive an indicia for submission to an admission system 104 and seeking admission to an event. Once the admission system 104 is notified of a request for execution of the demand token, an admission token is issued (S250) and the demand token is transitioned to a non-transferable state. Depending on implementation, the demand token becomes non-transferrable just prior to, immediately after, or simultaneously as when the admission token is issued. Otherwise, the demand token will remain in a transferable state, as provided in further detail below (S260). Accordingly, in response to the execution of the demand token, the admission token is associated with a right to attend the first activity such that a first entity is admissible to the first activity upon redemption of the admission token.

For example, the request for execution of the demand token may be implemented in form of a redeem request (e.g., a "redeem me" message) written to a record of the electronic ledger 101. The admission system 104 may be a legacy admission system that issues the admission token, in response to determining that the redeem request is written to a record of the electronic ledger 101. A legacy admission system as used herein refers to a system that is in use for the purpose of validating admission to an event and operates based on conventional ticket processing and validation technology (e.g., not using functionality related to blockchain transactions or other transactions on an electronic ledger platform).

Depending on implementation, a legacy admission system may be configured to communicate with a blockchain or any electronic ledger platform to issue the admission token in form of a quick response (QR) code that is transmittable to a communication device (e.g., a smartphone) utilized by an individual who desires admission to an event. In response to scanning the QR code, a record in an admission database 105 of the legacy admission system may be updated to indicate the second token is redeemed.

Accordingly, depending on implementation, the execution of the demand token may be accomplished in different manners. In one example, the admission system 104 may be notified, either directly or indirectly, by way of writing a demand token execution record to a block of the electronic ledger 101. As a result of the execution of the demand token, the owner of the demand token receives an admission token, which would be an asset of some form (e.g., a QR code, a URL, an e-ticket, a paper ticket, etc.) that allows admission to the event. A suggested earlier, in embodiments in which redeeming the admission ticket does not require a proof of transaction on the blockchain, the admission process can be streamlined efficiently and quickly obviating the need for a relatively lengthy wait time associated with blockchain transactions.

The admission system 104, in one or more embodiments, may create or modify data records in an admission database 105 to facilitate admitting attendees. An admission token record, if stored on the electronic ledger 101 may contain one or more of data identifying the owner of the admission token, a ticket or admission token identifier, and the corresponding signatures for authenticating the data. In certain implementations, a demand token execution record may be written to the electronic ledger 101 to indicate that no further transfer requests may be executed for the demand token or admission token that has been issued, unless the admission token is revoked or assigned.

Figure 2B:
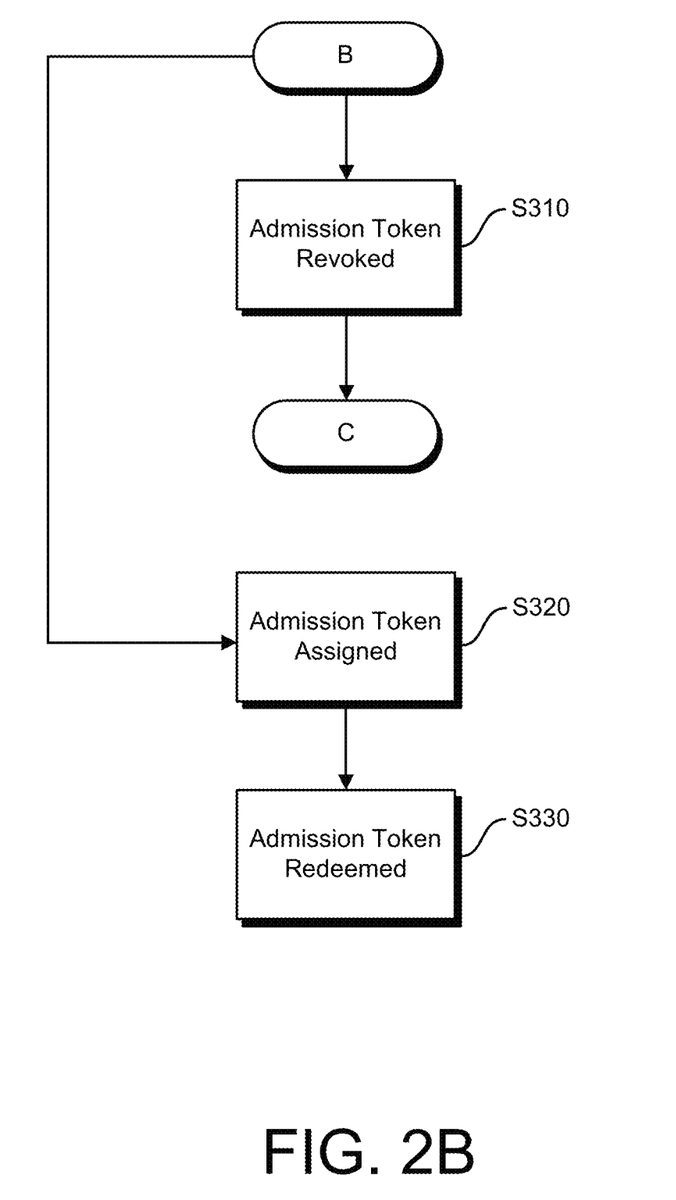

Referring to FIGS. 1B and 2B, the admission system 104 provides for an admission token to be transferred by revoking the admission token (S310). An admission token once revoked may be converted back to a demand token. This may be accomplished by writing an admission token revocation record to the electronic ledger 101 and causing a demand token issued 103 record to be added the electronic ledger (see FIG. 2A, S210). The revocation of the admission token may be performed in a single step or multiple steps and may involve multiple other systems, including a separate issuing system 102, for example.

The admission system 104, in one embodiment, signals a change in ownership of an admission token by assigning an admission token (S320). The assigning of an admission token is accomplished using different methods or schemes. For example, an admission token may be assigned by writing an admission token assigned record to the electronic ledger 101. The owner of an admission token may transfer or transact an admission token and give to another owner. One or more smart contracts may be utilized, where the original issuer or administrator (e.g. a primary ticketing agency) could force an admission token assignment either by revoking or reissuing the token or by issuing an assignment record, for example. As noted earlier, once an admission token is assigned to an owner, the owner may redeem the admission token at the time of attending an event (S330).

It is noteworthy that the electronic tokens and the corresponding systems disclosed herein may be utilized for the purpose of providing an owner of the admission token with access to any venue including, without limitation and by way of example, movie theatres, performance theatres, museums, exhibitions, concerts, seminars and any other type of event that may utilize or require admission by way of redemption of a ticket or other indicia of ownership. In certain implementations, the same or similarly implemented electronic tokens, platforms, and infrastructures may be utilized for providing an owner of an admission token with access to any type of content including, without limitation and by way of example, on-demand movies, and webpage or social media content, whether in form of text, audio or video, electronic books, etc.

Figure 2C:
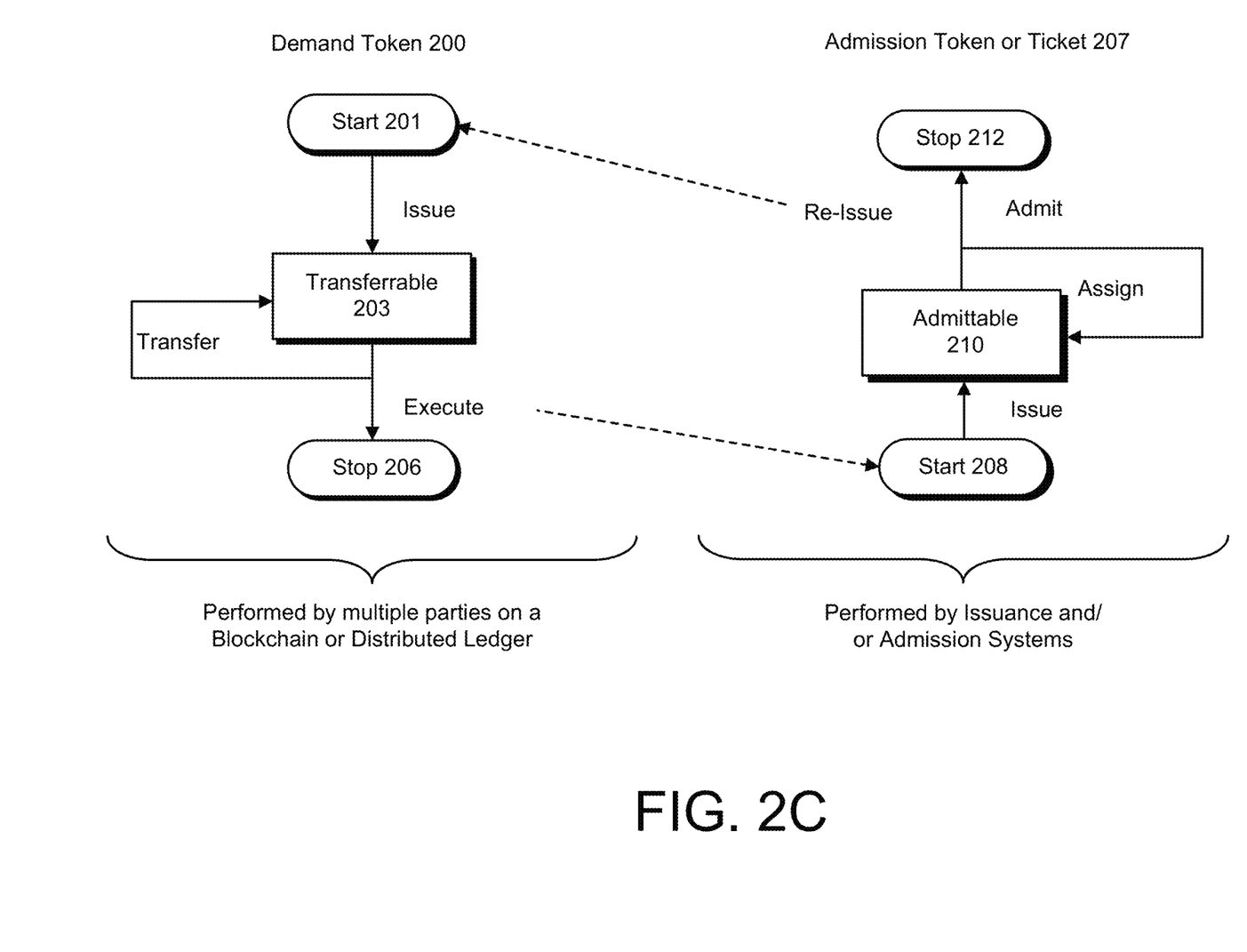
FIG. 2C is an example flow diagram illustrating possible state transitions for demand tokens and admission tokens in accordance with one or more implementations.

Referring to FIG. 2C, demand tokens and admission tokens may be distinct in accordance with one or more embodiments. As shown, the admission system 104 may be configured to convert tokens from demand tokens to admission tokens and vice versa. The state transition diagram of FIG. 2C illustrates the respective relationships. In one implementation, at a start state 201, the demand token is issued by an issuing system 102. The issued demand token may be held in a transferable state 203 and a current owner may transfer the demand token to a new owner, where the demand token remains transferable.

The current owner or the admission system 104 may execute the demand token, resulting in the demand token transitioning to a stop state 206. The admission system 104 may issue an admission token (i.e., a ticket) as the result of a demand token execution or for other reasons such as a direct purchase of an asset. The current owner or bearer may then be admitted to the corresponding event using the admission token by way of an admission system 104. Upon admission, the admission token is depleted and the system transitions to a stop state 212.

In certain embodiments or configurations, the admission system 104 may reissue a demand token or a non-depleted admission token for the purposes of further transfer. A demand token is started at start state 208 in such a scenario and the admission token is transferred to a stop state 212. In some implementations, the admission system 104 may assign an admission token from a first owner to a second owner. Notably, in certain implementations, a demand token may be retired or stopped and then restarted or reissued as another demand token representing the same ticket.

In accordance with one or more aspects, the demand token may be configured to be transferable over a blockchain and the admission token may be configured to be non-transferable over the blockchain. In certain embodiments, the non-transferability of the admission token may due to the admission token being assigned to a non-transferable state. In certain other embodiments, the non-transferability of the admission token may be due to the admission token not being transferable on the same blockchain, where the demand token is transferred.

In summary, in one or more implementations, an issuing system 102 in an electronic ledger platform issues a demand token associated with ownership rights to an admission token. The demand token is written to a block on an electronic ledger such that transfer of ownership rights to the issued demand token is subject to validation rules associated with the electronic ledger. In response to a request for execution of the demand token, an admission token is issued. The admission token is associated with a right to attend an event such that an owner of the admission token is admissible to the event upon redemption of the admission token.

The validation of transfer of ownership on the electronic ledger may be subject to validations rules (e.g., a first protocol or a validation protocol) that is different than the redemption rules (e.g., a second protocol or a redemption protocol) associated with the redemption of an admission token. In some aspects, processing the redemption of the admission token is subject to a redemption protocol that is less time consuming than processing the transfer of the ownership rights to the issued demand token subject to the validation protocol associated with committing transactions on the electronic ledger.

Figure 3:
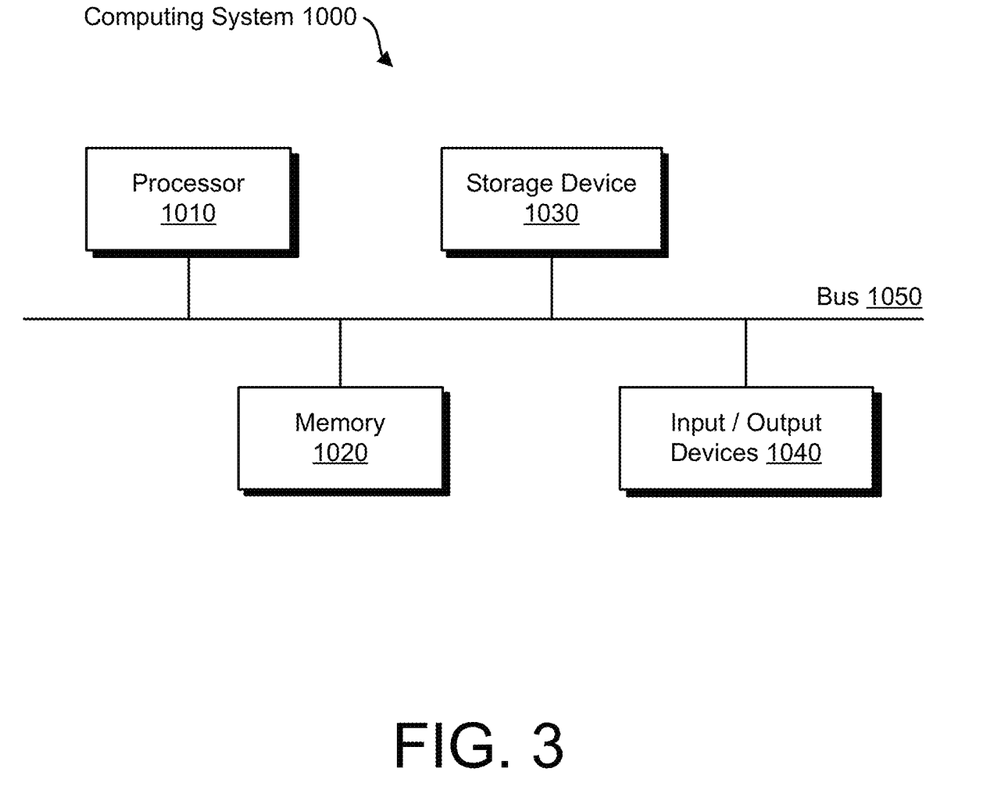
FIG. 3 is a block diagram of a computing system that may be utilized to perform one or more computer processes disclosed herein as consistent with one or more embodiments.

Referring to FIG. 3, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 3, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal.

The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

What is claimed is:

1. A computer-implemented method comprising:
receiving, by an admission system, an indication to exchange a first token of a first type with a second token of a second type, the indication being authorized by a first entity,
the first token issued by an issuing system, independent of the admission system, in response to the issuing system writing the first token on a block of an electronic ledger platform,
the first token associated with ownership information and comprising activity information, the ownership information indicating that the first token is owned by the first entity and the activity information indicating a first activity associated with admission of a holder of the second token to an event, and
wherein the ownership of the first token is transferable from the first entity to other entities over the electronic ledger platform in accordance with a first protocol for verifying the ownership information and validating a corresponding transaction for the transfer of the first token on the electronic ledger platform;
generating the second token in compliance with one or more rules,
the second token associated with admission information for the holder of the second token; and
committing the generation of the second token to one or more records on at least one of the admission system or an electronic ledger in the electronic ledger platform,
wherein the first protocol requires a first level of scrutiny at a higher level of confidence than a second protocol used for redeeming the second token and admitting the holder of the second token to the event.

2. The method of claim 1, wherein the ownership of the first token is transferred from the first party to a second party by committing a transaction associated with a transfer of the ownership to one or more records on the electronic ledger.

3. The method of claim 1, wherein the ownership of the first token becomes non-transferable, in response to generating the second token.

4. The method of claim 1, wherein the ownership of the second token is assignable, but is non-transferable over the electronic ledger platform.

5. The method of claim 1, wherein the second token is generated by the admission system executing the first token.

6. The method of claim 5, wherein the second system is notified of a request for execution of the first token based on reading an execution request written to a record of the electronic ledger.

7. The method of claim 6, wherein the ownership information associated with the first token is traceable based on the ownership information being written to a record of the electronic ledger, when ownership of the first token is transferred from the first entity to a second entity.

8. The method of claim 1, wherein the electronic ledger is a distributed electronic ledger.

9. The method of claim 1, wherein the electronic ledger is at least one of a public blockchain or a private blockchain.

10. The method of claim 5, wherein the second token is associated with a right to attend the first activity and the holder of the second token is not the first entity.

11. The method of claim 10, wherein the redemption of the second token is subject to the second protocol having been implemented for verifying the ownership of the first token over a platform other than the electronic ledger platform.

12. The method of claim 11, wherein a first length of time is associated with complying with the first protocol and a second length of time is associated with complying with the second protocol.

13. The method of claim 12, wherein the second length of time is shorter than the first length of time.

14. The method of claim 9, wherein the first token of the first type is transferable over the blockchain and the second token of the second type is non-transferable over the blockchain.

15. The method of claim 14, wherein the non-transferability of the second token of the second type is due to the second token being assigned to a non-transferable state.

16. The method of claim 15, wherein the non-transferability of the second token of the second type is due to the second token not being on the blockchain.

17. The method of claim 6, wherein the execution request is implemented in form of a redeem message written to the record of the electronic ledger.

18. The method of claim 17, wherein the second system is a legacy system that issues the second token, in response to determining that the redeem message is written to the record of the electronic ledger.

19. The method of claim 18, wherein the legacy system issues the second token in form of at least one of a quick response (QR) code, a bar code, or a digital identifier that is transmittable to a communication device utilized for obtaining admission to the event.

20. The method of claim 19, wherein in response to scanning of the QR code, a record in a database of the legacy system is updated to indicate the second token is redeemed.

21. A system comprising:
   at least one programmable processor; and
   a non-transitory machine-readable medium storing instructions that, when executed by the at least one programmable processor, cause the at least one programmable processor to perform operations comprising:
   receiving, by an admission system, an indication to exchange a first token of a first type with a second token of a second type, the indication being authorized by a first entity, the first token issued by an issuing system, independent of the admission system, in response to the issuing system writing the first token on a block of an electronic ledger platform,
      the first token associated with ownership information and comprising activity information, the ownership information indicating that the first token is owned by the first entity and the activity information indicating a first activity associated with admission of a holder of the second token to an event, and
      wherein the ownership of the first token is transferable from the first entity to other entities over the electronic ledger platform in accordance with a first protocol for verifying the ownership information and validating a corresponding transaction for the transfer of the first token on the electronic ledger platform;
   the second token generated in compliance with one or more rules, the second token associated with admission information for the holder of the second token; and
   the generation of the second token committed to one or more records on at least one of the admission system or an electronic ledger in the electronic ledger platform,
   wherein the first protocol requires a first level of scrutiny at a higher level of confidence than a second protocol used for redeeming the second token and admitting the holder of the second token to the event.

22. A computer program product comprising a non-transitory machine-readable medium storing instructions that, when executed by at least one programmable processor, cause the at least one programmable processor to perform operations comprising:
   receiving, by an admission system, an indication to exchange a first token of a first type with a second token of a second type, the indication being authorized by a first entity, the first token issued by an issuing system, independent of the admission system, in response to the issuing system writing the first token on a block of an electronic ledger platform,
      the first token associated with ownership information and comprising activity information, the ownership information indicating that the first token is owned by the first entity and the activity information indicating a first activity associated with admission of a holder of the second token to an event, and
      wherein the ownership of the first token is transferable from the first entity to other entities over the electronic ledger platform in accordance with a first protocol for verifying the ownership information and validating a corresponding transaction for the transfer of the first token on the electronic ledger platform;
   the second token generated in compliance with one or more rules, the second token associated with admission information for the holder of the second token; and
   the generation of the second token committed to one or more records on at least one of the admission system or an electronic ledger in the electronic ledger platform,
   wherein the first protocol requires a first level of scrutiny at a higher level of confidence than a second protocol used for redeeming the second token and admitting the holder of the second token to the event.

* * * * *